(12) United States Patent
Min et al.

(10) Patent No.: US 10,974,631 B2
(45) Date of Patent: Apr. 13, 2021

(54) SEAT COVER FOR AUTOMOBILE AND MANUFACTURING METHOD THEREFOR

(71) Applicant: LG Hausys, Ltd., Seoul (KR)

(72) Inventors: Chul-Hee Min, Ulsan (KR); Yong-Bae Jung, Ulsan (KR); Nam-Keun Choi, Ulsan (KR)

(73) Assignee: LG HAUSYS, LTD., Seoul (KR)

( * ) Notice: Subject to any disclaimer, the term of this patent is extended or adjusted under 35 U.S.C. 154(b) by 149 days.

(21) Appl. No.: 15/545,229

(22) PCT Filed: Jan. 19, 2016

(86) PCT No.: PCT/KR2016/000538
§ 371 (c)(1),
(2) Date: Sep. 26, 2017

(87) PCT Pub. No.: WO2016/117902
PCT Pub. Date: Jul. 28, 2016

(65) Prior Publication Data
US 2018/0099594 A1    Apr. 12, 2018

(30) Foreign Application Priority Data

Jan. 22, 2015  (KR) .................. 10-2015-0010804

(51) Int. Cl.
*B60N 2/58* (2006.01)
*B32B 5/18* (2006.01)
(Continued)

(52) U.S. Cl.
CPC .............. *B60N 2/5891* (2013.01); *B32B 3/02* (2013.01); *B32B 3/263* (2013.01); *B32B 3/30* (2013.01);
(Continued)

(58) Field of Classification Search
CPC .............. B32B 3/02; B32B 3/263; B32B 3/30
See application file for complete search history.

(56) References Cited

U.S. PATENT DOCUMENTS 3,052,643 A * 9/1962 Lineberry ................ C08J 9/143
521/73
4,210,693 A    7/1980 Regan et al.
(Continued)

FOREIGN PATENT DOCUMENTS

CN    1312301 A    9/2001
CN    1362978 A    8/2002
(Continued)

OTHER PUBLICATIONS

Chinese Office Action dated Aug. 28, 2018 for corresponding Chinese Application No. 201680006773.8.
(Continued)

*Primary Examiner* — Hai Vo
(74) *Attorney, Agent, or Firm* — Hauptman Ham, LLP

(57) ABSTRACT

Provided are a seat cover for an automobile and a manufacturing method therefor, the seat cover comprising a surface-treated layer, a cover layer, a soft foam layer, and a rear layer and comprising an embossing pattern formed on the top surface, wherein the soft foam layer comprises 15 to 20 foam cells per unit area of 1 mm$^2$ of the surface thereof.

12 Claims, 1 Drawing Sheet

(51) Int. Cl.
| | |
|---|---|
| *B32B 27/06* | (2006.01) |
| *B32B 27/12* | (2006.01) |
| *B32B 38/06* | (2006.01) |
| *B32B 27/30* | (2006.01) |
| *D06Q 1/00* | (2006.01) |
| *B32B 5/02* | (2006.01) |
| *B32B 5/20* | (2006.01) |
| *D06N 3/08* | (2006.01) |
| *B32B 5/24* | (2006.01) |
| *B32B 3/26* | (2006.01) |
| *B32B 3/02* | (2006.01) |
| *B32B 5/22* | (2006.01) |
| *B32B 27/18* | (2006.01) |
| *B32B 3/30* | (2006.01) |
| *B32B 27/40* | (2006.01) |
| *D06N 3/00* | (2006.01) |
| *D06N 3/14* | (2006.01) |

(52) U.S. Cl.
CPC .............. *B32B 5/02* (2013.01); *B32B 5/18* (2013.01); *B32B 5/20* (2013.01); *B32B 5/22* (2013.01); *B32B 5/24* (2013.01); *B32B 27/06* (2013.01); *B32B 27/065* (2013.01); *B32B 27/12* (2013.01); *B32B 27/18* (2013.01); *B32B 27/304* (2013.01); *B32B 27/40* (2013.01); *B32B 38/06* (2013.01); *B60N 2/58* (2013.01); *B60N 2/5816* (2013.01); *D06N 3/005* (2013.01); *D06N 3/0011* (2013.01); *D06N 3/0036* (2013.01); *D06N 3/0077* (2013.01); *D06N 3/0079* (2013.01); *D06N 3/08* (2013.01); *D06N 3/144* (2013.01); *D06N 3/145* (2013.01); *D06Q 1/00* (2013.01); *B32B 5/245* (2013.01); *B32B 2250/03* (2013.01); *B32B 2250/04* (2013.01); *B32B 2255/00* (2013.01); *B32B 2255/10* (2013.01); *B32B 2255/26* (2013.01); *B32B 2262/0261* (2013.01); *B32B 2262/0276* (2013.01); *B32B 2262/04* (2013.01); *B32B 2262/062* (2013.01); *B32B 2266/0214* (2013.01); *B32B 2266/0235* (2013.01); *B32B 2266/0278* (2013.01); *B32B 2266/0292* (2013.01); *B32B 2266/06* (2013.01); *B32B 2266/10* (2016.11); *B32B 2270/00* (2013.01); *B32B 2305/022* (2013.01); *B32B 2305/18* (2013.01); *B32B 2305/20* (2013.01); *B32B 2307/54* (2013.01); *B32B 2307/72* (2013.01); *B32B 2601/00* (2013.01); *B32B 2605/003* (2013.01); *D06N 2201/042* (2013.01); *D06N 2211/14* (2013.01); *D06N 2211/263* (2013.01)

(56) References Cited

U.S. PATENT DOCUMENTS

| | | | |
|---|---|---|---|
| 4,883,694 | A * | 11/1989 | Ramalingam ...... C08G 18/0823 428/35.2 |
| 9,169,420 | B2 * | 10/2015 | Morikami ............ C09D 175/06 |
| 2001/0031797 | A1 | 10/2001 | Kuwamura et al. |
| 2002/0193459 | A1 | 12/2002 | Haseyama et al. |
| 2003/0170443 | A1 | 9/2003 | Kobe et al. |
| 2010/0267861 | A1 * | 10/2010 | Iben ..................... C08G 18/61 523/157 |

FOREIGN PATENT DOCUMENTS

| | | |
|---|---|---|
| CN | 1400986 A | 3/2003 |
| CN | 101263187 A | 9/2008 |
| EP | 2 357 276 A1 | 8/2011 |
| GB | 1 424 405 A | 2/1976 |
| JP | 2003040983 A | 2/2003 |
| KR | 10-0415196 B1 | 1/2004 |
| KR | 10-2005-0115381 A | 12/2005 |
| KR | 10-2011-0095663 A1 | 8/2011 |
| KR | 10-2013-0120567 A | 11/2013 |
| KR | 10-2014-01030138 A | 11/2014 |
| KR | 10-1861411 B1 | 5/2018 |
| WO | 01/05569 A1 | 1/2001 |

OTHER PUBLICATIONS

European Search Report issued in corresponding European Patent Application No. 16740375.7, dated Jan. 5, 2018.
International Search Report dated Apr. 20, 2016 from ISA/KR in connection with the International Application No. PCT/KR2016/000538.
Chinese Office Action dated Apr. 28, 2019 in connection to counterpart Chinese Patent Application No. 201680006773.8.

* cited by examiner (a)

(b)

SEAT COVER FOR AUTOMOBILE AND MANUFACTURING METHOD THEREFOR

CROSS REFERENCE TO RELATED APPLICATION

This present application is a national stage filing under 35 U.S.C § 371 of PCT application number PCT/KR2016/000538 filed on Jan. 19, 2016 which is based upon and claims the benefit of priority to Korean Patent Application No. 10-2015-0010804 filed on Jan. 22, 2015 in the Korean Intellectual Property Office. The disclosures of the above-listed applications are hereby incorporated by reference herein in their entirety.

TECHNICAL FIELD

The present disclosure relates to a seat cover for an automobile and a manufacturing method therefor.

BACKGROUND ART

Recently, automobiles are regarded as a second residential space. A seat cover for an automobile occupies a large part in the vehicle, and it is an area directly touching the human body, so the consumer's interest is increasing. Researches on the seat cover for an automobile have been actively carried out in order to obtain a clean environment in the vehicle and properties not harmful to the human body. Korean Patent No. 10-0546863, for example, discloses a seat cover for an automobile, which can reduce static electricity frequently occurring at a portion where clothes and sheets are in contact with each other at the time of getting in and out of a car, and also can shield electromagnetic waves generated from electronic parts embedded in the automobiles. In addition, as interests in indoor air quality in the automobiles steadily increases, the Ministry of Land, Transport and Maritime Affairs (Republic of Korea) published the "Standards for New Indoor Air Quality Management." As a result, it was recommended to keep volatile organic compounds (VOCs) such as benzene, toluene, ethylbenzene, xylene, and formaldehyde below the regulated values from new cars manufactured after Jul. 1, 2009.

DISCLOSURE

Technical Problem

One aspect of the present disclosure is to provide a seat cover for an automobile that is both human and environmentally friendly and has a texture similar to that of natural leather.

Another aspect of the present disclosure is to provide a method for manufacturing a seat cover for an automobile.

Technical Solution

In one embodiment of the present disclosure, provided is a seat cover for an automobile, including a surface-treated layer, a cover layer, a soft foam layer, and a rear layer and including an embossing pattern formed on its uppermost surface, wherein the soft foam layer includes 15 to 20 foam cells per unit area of 1 mm$^2$ of the layer surface.

The soft foam layer may have a specific gravity of 0.7 to 0.8.

The foam cell may be a spherical foam cell.

The foam cell may have an average diameter of 135 μm to 200 μm.

The soft foam layer may be formed from a composition for preparing a foam layer comprising a thermoplastic resin and a foaming agent.

The composition for preparing a foam layer may contain 5 to 10 parts by weight of the foaming agent, based on 100 parts by weight of the thermoplastic resin.

The thermoplastic resin may include at least one selected from the group consisting of a thermoplastic polyurethane (TPU) resin, a polyvinyl chloride (PVC) resin, a polyvinylidene chloride (PVDC) resin, a polyvinylidene fluoride (PVF) resin, a chlorinated polyvinyl chloride (CPVC) resin, a polyvinyl alcohol (PVA) resin, polyvinyl acetate (PVAc) resin, polyvinyl butyrate (PVB) resin, polyethylene (PE) resin, polypropylene (PP) resin, and combinations thereof.

The embossing pattern may be formed by a vacuum embossing method.

The seat cover for an automobile may have a constant load elongation in the MD direction of 17% to 20% and a constant load elongation in the TD direction of 35% to 42%.

The residual compression set in the MD direction of the seat cover for an automobile may be 4% or less, and the residual compression set in the TD direction may be 14% or less.

The surface-treated layer may be formed of a waterborne coating composition.

The waterborne coating composition may include a main ingredient comprising a first compound having at least two functional groups selected from the group consisting of a carboxyl group, a hydroxyl group, an amino group, and combinations thereof, per molecule; a curing agent comprising a second compound having at least two functional groups selected from the group consisting of an aziridine group, an isocyanate group, a carbodiimide group, and combinations thereof, per molecule; and an aqueous solvent.

The aqueous solvent may include water or an alcohol.

The amount of volatile organic compounds (VOCs) generated in the seat cover for an automobile may be 300 μg/m$^2$ or less.

The cover layer may include at least one selected from the group consisting of polyvinyl chloride (PVC), polyvinyl chloride copolymer, polyurethane (PU), polyurethane copolymer, polypropylene oxide (PPO), polypropylene oxide copolymer, polyethylene oxide (PEO), polyethylene oxide copolymer, polyether urethane, cellulose acetate, cellulose acetate butyrate, cellulose acetate propionate, polymethyl methacrylate (PMMA), polymethyl acrylate (PMA), polyacrylic copolymer, polyvinyl acetate (PVAc), polyvinyl acetate copolymer, polyvinyl alcohol (PVA), polyfurfuryl alcohol (PPFA), polystyrene (PS), polystyrene copolymer, polycarbonate (PC), polycaprolactone (PCL), polyvinylpyrrolidone (PVP), polyvinylidene fluoride (PVdF), polyvinylidene fluoride copolymer, polyamide, and combinations thereof.

The rear layer may be a woven or nonwoven fabric comprising at least one selected from the group consisting of cotton, nylon, polyester, rayon, and combinations thereof.

The soft foam layer may have a thickness in the range of 0.8 mm to 0.9 mm.

In another embodiment of the present disclosure, there is provided a method for manufacturing a seat cover for an automobile, including the steps of: preparing a laminate comprising a surface-treated layer, a cover layer, a soft foam layer, and a rear layer; and forming an embossing pattern on a top surface of the laminate by a vacuum embossing process.

The surface-treated layer may be formed by applying and drying a waterborne coating composition on the cover layer, followed by a first aging at a temperature above a minimum film forming temperature (MFFT) of the waterborne coating composition, and then a second aging at a temperature above a glass transition temperature (Tg) of the waterborne coating composition.

The soft foam layer may be formed by heating and foaming a composition for preparing a foam layer at a temperature of 200° C. to 220° C.

The vacuum embossing process may be performed under a vacuum gauge pressure of 0.05 MPa to 0.06 MPa.

The vacuum embossing process may be performed at a temperature of 160° C. to 180° C.

Advantageous Effects

The seat cover for an automobile can exhibit a texture similar to that of natural leather on the basis of excellent foam characteristics, and can achieve an effect of excellent stain resistance and environment friendliness.

In addition, the seat cover for an automobile having excellent physical properties can be produced through a simple process through a method for manufacturing the seat cover for an automobile.

BEST MODE

Figure 1:
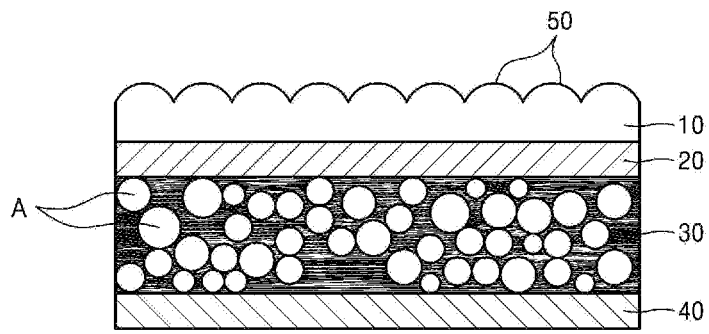
FIG. 1 schematically shows a cross-sectional view of a seat cover for an automobile according to an embodiment of the present disclosure.

Advantages and features of the present disclosure and methods of achieving them will become apparent with reference to the embodiments described hereinafter. However, it will be understood that the present disclosure is not limited to the embodiments disclosed herein, but may be embodied in many different forms. Further, the embodiments disclosed herein should not be construed as limiting the present disclosure set forth herein, and thus the present disclosure is only defined by the scope of the claims. Like reference numerals refer to like elements throughout the specification.

In the drawings, the thicknesses are enlarged to clearly indicate layers and regions. Further, in the drawings, for the convenience of explanation, the thicknesses of some layers and regions are exaggerated.

In addition, in this specification, when a layer, film, region, plate, or the like is referred to as being "on" or "above" another region, this includes not only the case where it is "directly on" another part but also the case where there is another part in the middle. Conversely, when a part is "directly above" another part, it means that there is no other part in the middle. In addition, when a layer, film, region, plate, or the like is referred to as being "under" or "beneath" another region, this includes not only the case where it is "directly under" another part but also the case where there is another part in the middle. Conversely, when a part is "directly under" another part, it means that there is no other part in the middle.

In one embodiment of the present disclosure, provided is a seat cover for an automobile, including a surface-treated layer, a cover layer, a soft foam layer, and a rear layer and including an embossing pattern formed on the top surface, wherein the soft foam layer includes 15 to 20 foam cells per unit area of 1 mm$^2$ of the layer surface.

FIG. 1 schematically shows a cross-sectional view of a seat cover for an automobile 100 according to an embodiment of the present disclosure. Referring to FIG. 1, the seat cover for an automobile 100 is a structure in which a surface-treated layer 10, a cover layer 20, a soft foam layer 30, and a rear layer 40 are sequentially laminated from above, and may include an embossing pattern 50 formed on the surface-treated layer 10, that is, on the top surface of the seat cover for an automobile 100.

The seat cover for an automobile 100 has an excellent cushioning feel, which can specifically be achieved by the soft foam layer 30 exhibiting excellent foam characteristics and suitable physical properties.

Specifically, the soft foam layer 30 may include about 15 to about 20 foam cells per unit area of 1 mm$^2$ of the layer surface. As used herein, the term "foam cell" refers to a bubble generated by foaming during the production of the soft foam layer.

If the soft foam layer 30 includes less than about 15 foam cells per unit area of 1 mm$^2$, the seat cover for an automobile 100 may not have a good softness and cushioning feel, while if the soft foam layer 30 includes more than about 20 foam cells, the surface durability of the seat cover for an automobile 100 may be excessively reduced or the surface texture or the physical properties of the seat cover for an automobile 100 may be deteriorated due to the expansion of the foam cells during the embossing pattern formation process.

Further, the soft foam layer 30 may have a specific gravity of from about 0.7 to about 0.8, for example, from about 0.74 to about 0.76. If the specific gravity of the soft foam layer 30 is less than about 0.7, the durability of the seat cover for an automobile may be excessively decreased. On the contrary, if the specific gravity of the soft foam layer 30 is more than about 0.8, the required softness and cushioning feel may not be obtained.

That is, since the soft foam layer 30 satisfies the specific gravity within the above range and the number of foal cells, a superior cushioning feel as well as appropriate durability and excellent surface texture can be achieved.

The foam cells included in the soft foam layer 30 may be spherical foam cells. As used herein, the term "spherical foam cell" refers to a shape that is distorted by an external pressure or contrasts with a shape of a foam cell having a sharp point. It does not necessarily mean a geometrically perfect spherical shape, and it should be understood as a concept that covers all the levels that can be covered when referring to spherical cells for individual foam cells. Therefore, in the present specification, a spherical foam cell should be understood as being broadly understood not to be deformed by a physical external force but to maintain a spherical shape at the time of foaming.

Since a flexible foam layer 30 includes such a spherical foam cell, that is, the physical structure of the foam cell is not deformed by external pressure, the soft property can be improved, and a spherical foam cell can maintain a good cushioning feel by maintaining the number of foam cells within the above-mentioned range.

The soft foam layer in the seat cover for an automobile includes a spherical foam cell having about 15 to about 20 foam cells per unit area of 1 mm$^2$ of the layer surface and having a specific gravity of about 0.7 to about 0.8. In this case, the cushioning feel and surface texture for the seat cover for an automobile can be remarkably improved.

The average diameter of the foam cells in the soft foam layer may be about 135 μm to about 200 μm. The average diameter of the foam cells indicates the average value of the diameters of one foam cell. The foam cells have an average diameter satisfying the above range, and maintain a spherical shape, such that the seat cover for an automobile 100 can secure high softness and workability, and can exhibit excellent cushioning feel.

The soft foam layer may be formed from a composition for preparing a foam layer comprising a thermoplastic resin and a foaming agent. Specifically, the thermoplastic resin and the foaming agent may be mixed to prepare a composition for preparing a foam layer. The composition for preparing a foam layer may be coated to a predetermined thickness, and then foamed at a higher temperature.

The composition for preparing a foam layer may contain about 5 to about 10 parts by weight of the foaming agent, based on 100 parts by weight of the thermoplastic resin. When the amount of the foaming agent is less than about 5 parts by weight, the number of foam cells in the soft foam layer may not satisfy the range, resulting in a decrease in softness and cushioning feel, while when included more than about 10 parts by weight, there is a possibility that the foam cells will be excessively produced, resulting in the deterioration of surface physical properties and durability.

Specifically, the thermoplastic resin may include at least one selected from the group consisting of a thermoplastic polyurethane (TPU) resin, a polyvinyl chloride (PVC) resin, a polyvinylidene chloride (PVDC) resin, a polyvinylidene fluoride (PVF) resin, a chlorinated polyvinyl chloride (CPVC) resin, a polyvinyl alcohol (PVA) resin, polyvinyl acetate (PVAc) resin, polyvinyl butyrate (PVB) resin, polyethylene (PE) resin, polypropylene (PP) resin, and combinations thereof.

For example, the thermoplastic resin may include a mixture of a thermoplastic polyurethane (TPU) resin and a polyvinyl chloride (PVC) resin. In this case, the thermoplastic resin may be advantageous in securing an excellent cushioning feel, a higher elongation, and an excellent durability.

In addition, the composition for preparing a foam layer may further contain an appropriate amount of plasticizer to facilitate control of hardness and processing temperature.

The seat cover for an automobile 100 may include an embossing pattern 50 formed on the top surface. The embossing pattern imparts excellent surface texture to the seat cover for an automobile and improves surface durability.

Generally, the embossing pattern can be formed using a roll press method. Such a roll press method is formed by using an embossing roll having an embossing shape on the surface thereof. Since this is performed under a condition of applying a high pressure, when an embossing pattern is formed on the surface of the multilayer structure using embossing rolls, there is a possibility that the physical properties of each layer may be denatured or damaged, and, for example, the structure of the foam cells of the soft foam layer may be damaged due to a pressure of the press.

Another method for forming an embossing pattern may include a rotary screening or a silk screening. In this case, an embossed layer is formed by a rotary screen or a silk screen method using a separate raw material constituting the embossing pattern. In this case, since a separate raw material constituting the embossing pattern is required, it may be disadvantageous in terms of manufacturing cost and manufacturing process. Also in this case, the bubble structure may be damaged as compared with the case where a soft foam layer is formed by a vacuum embossing method as described later.

On the other hand, the seat cover for an automobile 100 may include an embossing pattern 50 on the uppermost surface, and the embossing pattern 50 may be formed by a vacuum embossing method. The vacuum embossing method is a method of transferring the embossing pattern by sucking a seat cover in a vacuum without applying heat and pressure. Since the embossing pattern 50 of the seat cover for an automobile 100 is formed by a vacuum embossing method, a change in thickness and physical properties is small, and in particular, the soft foam layer 30 maintains excellent foam characteristics, whereby cushioning and surface texture can be realized.

The seat cover for an automobile may have a constant load elongation in the MD direction of about 17% to about 20% and a static load elongation in the TD direction of about 35% to about 42%. When the above-described constant load elongation in the MD direction and the TD direction for the seat cover for an automobile satisfy the above ranges, the wrinkle preventing performance of the surface can be improved to provide an excellent surface appearance, and at the same time, the workability in the process can be improved.

In the present specification, the MD direction refers to a moving direction of the laminate, that is, a machine direction (MD) when each layer of the seat cover for an automobile is stacked to produce a laminate. The TD direction is understood to mean a transverse direction (TD) perpendicular to the MD direction.

Further, the seat cover for an automobile may have a residual compression set in the MD direction of about 4% or less, for example, about 2% to about 4%, and a residual compression set in the TD direction of about 14% or less, for example, about 4% to about 6%. When the residual compression set for the seat cover for an automobile satisfies the above-mentioned ranges in the MD direction and the TD direction, respectively, it is possible to realize a flat top shape which is flat at the time of sewing so that a clean finishing work can be carried out and the wrinkle preventing performance or the distortion preventing performance can be advantageously improved.

Specifically, the static load elongation and the residual compression set can be measured by the following method. The seat cover for an automobile is made of a test specimen having a width of 50 mm and a length of 250 mm. Then, three test specimens each having a width in the MD direction and a width in the TD direction are taken, and 100 mm line is drawn at the center thereof. This is set at a clamp interval of 150 mm, and the load is left as it is for 10 minutes in a fatigue tester, and then the distance L1 between the lines is measured. Further, the test specimen is removed from the clamp, the load is removed, and the test specimen is left on a flat surface for 10 minutes, and then the distance L2 between the lines is obtained. The static load elongation and the residual compression set can be calculated according to the following formula.

$$\text{Static load elongation (\%)} = L1 - 100$$

$$\text{Residual compression set (\%)} = L2 - 100 \qquad \text{[Formula]}$$

L1: distance of the line after 10 minutes under load
L2: distance of the line after 10 minutes after removing the load The seat cover for an automobile 100 includes a surface-treated layer 10, and the surface-treated layer 10 may be formed of a waterborne coating composition. The waterborne coating composition uses an aqueous solvent, which can reduce odor generating substances from volatile organic compounds (VOCs) due to use of an organic solvent, and excellent workability can be achieved in forming the embossing pattern on the uppermost portion of the seat cover 100 by a vacuum embossing method.

Specifically, the waterborne coating composition may include a main ingredient comprising a first compound having at least two functional groups selected from the group consisting of a carboxyl group, a hydroxyl group, an amino group, and combinations thereof, per molecule; a curing agent comprising a second compound having at least two functional groups selected from the group consisting of an aziridine group, an isocyanate group, a carbodiimide group, and combinations thereof, per molecule; and an aqueous solvent.

In addition, the waterborne coating composition can form polymer chains by a three-dimensional crosslinking reaction of the main ingredient and the curing agent, and the crosslinking density of the polymer chains can be from about 70% to about 95%. The crosslinking density of the polymer chain refers to a ratio of the number of crosslinking points to the total number of the constituent units of the polymer chain, and the crosslinking density can be measured by a crosslinking degree measurement method (KS M 3357). The stain resistance of the seat cover can be improved by keeping the polymer chain in the above range of crosslinking density.

Further, the curing agents not participating in the three-dimensional crosslinking reaction with the polymer chain may be entangled to form an interpenetrating polymer network.

The term "interpenetrating polymer network" refers to a multicomponent polymer entangled with each other without the polymer chains of different species being covalently bonded. Specifically, it can be seen that the waterborne coating composition forms a structure in which the polymer chain formed by a three-dimensional crosslinking reaction is entangled with a residual curing agent not participating in the three-dimensional crosslinking reaction due to an aqueous solvent.

Since the aqueous coating composition includes an aqueous solvent, the polymer chain and the curing agent not participating in the three-dimensional cross-linking reaction can form an interpenetrating polymer network structure, such that excellent slippery property can be obtained, thereby minimizing a noise in the vehicle. In addition, the waterborne coating composition can improve a stain resistance and can impart an excellent processability to the formation of embossing patterns through a vacuum embossing process.

The waterborne coating composition for forming the surface-treated layer 10 may include a main ingredient containing the first compound.

Specifically, the first compound has at least two functional groups selected from the group consisting of a carboxyl group, a hydroxyl group, an amino group, and combinations thereof, per molecule.

More specifically, the first compound may include at least one selected from the group consisting of a polyester-based compound, a lactone-based compound, a polycarbonate-based compound, a polyether-based compound, and combinations thereof, and at the terminal of the molecule, may have at least two functional groups selected from the group consisting of a carboxyl group, a hydroxyl group, an amino group, and combinations thereof.

For example, the main ingredient may be a prepolymer containing a urethane group in the main chain of the first compound. The term "prepolymer" refers to a polymer having a relatively low degree of polymerization in which the polymerization reaction is stopped in the middle stage to facilitate molding, and may indicate a structure containing a urethane group in the main chain of the first compound having at least two functional groups selected from the group consisting of a carboxyl group, a hydroxyl group, an amino group, and combinations thereof, per molecule. For example, the main ingredient may include a compound having the structure of the following formula 1.

[Formula 1]

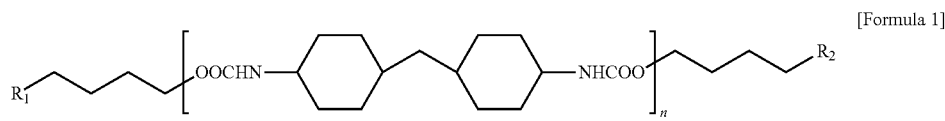

In the general formula 1, $R_1$ and $R_2$ may be the same or different and each may be a carboxyl group, a hydroxyl group, or an amino group. In Formula 1, n is an integer of 100 to 200.

Further, as another example, the main ingredient may be a siloxane-containing prepolymer comprising a siloxane group in the main chain of the first compound. That is, the main ingredient may be a silicon-containing prepolymer comprising a siloxane group in the main chain of the first compound having at least two functional groups selected from the group consisting of a carboxyl group, a hydroxyl group, an amino group, and combinations thereof, per molecule. For example, the main ingredient may include a compound having the structure of Formula 2 below.

[Formula 2]

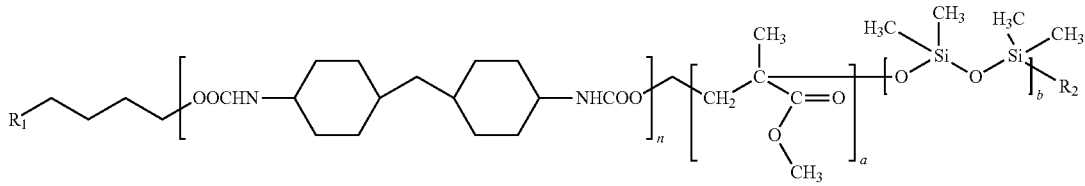

In the general Formula 2, $R_1$ and $R_2$ may be the same or different and each may be a carboxyl group, a hydroxyl group or an amino group. Further, in Formula 2, n, a and b are each an integer of 100 to 200, respectively.

The waterborne coating composition for forming the surface-treated layer 10 may include a curing agent comprising the second compound.

The second compound may have at least two functional groups selected from the group consisting of an aziridine group, an isocyanate group, a carbodiimide group, and combinations thereof, per molecule.

Specifically, the compound having an aziridine group refers to a compound including a 3-membered ring composed of two carbon atoms and one nitrogen atom, and may include, for example, at least one selected from the group consisting of 3-(3-methoxyphenyl)-3-trifluoromethyl)-diaziridine; 3-(trifluoromethyl)-3-phenyldiaziridine; propane-2,2-diyldibenzene-4,1-diyldiaziridine-1-carboxylate; 1,1'-(butylphosphoryl)diaziridine; oxydiethane-2,1-diyldiaz- iridine-1-carboxylate; 3,3-bis(1,1-difluoro-hexyl)-[1,2]diaziridine; 1-Aziridinepropanoicacid; 2-methyl-2-[[3-(2-methyl-1-aziridinyl)-1-oxopropoxy]methyl]-1,3-propanediylester; 2-ethyl-2-[[3-(2-methyl-1-aziridinyl)-1-oxopropoxy]methyl]-1,3-propanediylester; 2-ethyl-2-[[3-(2-methyl-1-azir- idinyl)-1-oxopropoxy]methyl]-1,3-propanediylbis(2-methyl-1-aziridinepropanoate); pentaerythritol tris[3-(1-aziridinyl) propionate], pentaerythritol tris(3-aziridinopropionate), and combinations thereof.

Further, the compound having an isocyanate group may include at least one selected from the group consisting of toluene diisocyanate, diphenylmethane diisocyanate, modified diphenylmethane diisocyanate, naphthalene diisocyanate, phenylenediisocyanate, hexamethylene diisocyanate, lysine isocyanate, cyclohexane diisocyanate, isophorone diisocyanate, methylene diphenyl isocyanate, xylene diisocyanate, tetramethyl xylylene diisocyanate, norbornene diisocyanate, triphenylmethane triisocyanate, polyphenyl polymethylene polyisocyanate, polyisocyanates containing carbodiimide groups, polyisocyanate containing allophanate groups, polyisocyanate containing an isocyanurate group, and combinations thereof.

Specifically, the compound having an isocyanate group may include a biuret type, a trimer type, and an adduct type, and, for example, the burette type isocyanate compound may include a compound of the following formula 3; the trimer-type isocyanate compound may include a compound of the following formula 4; and the adduct-type isocyanate compound may include a compound of the following formula 5.

[Formula 3]

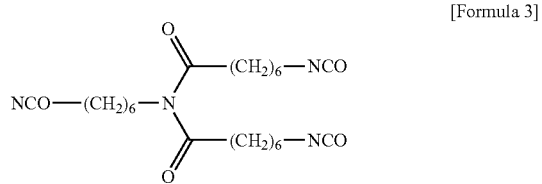

[Formula 4]

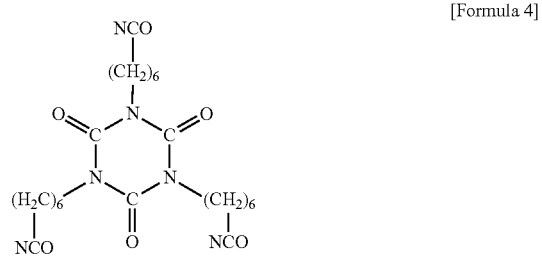

[Formula 5]

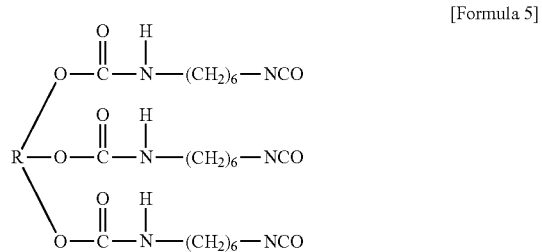

In addition, the compound having two or more carbodiimide groups may include 1-ethyl-3-(3-dimethylamino) propyl) carbodiimide compound.

The waterborne coating composition for forming the surface-treated layer 10 includes an aqueous solvent, wherein the "aqueous solvent" may specifically include, but is not limited to, water or alcohol, in contrast to an organic solvent.

The waterborne coating composition may include about 70% to about 80% by weight of the main ingredient, about 10% to about 20% by weight of the curing agent, and about 10% to about 20% by weight of the aqueous solvent. When the waterborne coating composition contains each component in the above-described range, the surface coating layer can secure excellent surface physical properties; embossing patterns can easily be formed by a vacuum embossing method; and superior pollution and environment-friendly effects can be achieved.

The seat cover for an automobile 100 includes a surface-treated layer 10 formed from the waterborne coating composition, and it is therefore possible to obtain an effect that is friendly to the human body and the environment since the generation of volatile organic compounds is less than that when the organic solvent is used.

Specifically, the amount of volatile organic compounds (VOCs) generated in the seat cover may be about 300 µg/m² or less. For example, the amount of volatile organic compounds generated may be up to about 200 μg/m², for example, up to about 100 μg/m², such as, up to about 50 μg/m².

The seat cover for an automobile 100 includes a surface-treated layer formed of the waterborne coating composition and an embossing pattern formed by a vacuum embossing method on the top surface thereof. Thus, the amount of the volatile organic compounds generated through the seat cover for an automobile 100 satisfies the above range. Further, it is possible to prevent the occurrence of an unpleasant odor and ensure an effect that is friendly to human body and environment.

Referring to FIG. 1, the seat cover for an automobile 100 may further include a cover layer 20 and a rear layer 40, in addition to the surface-treated layer 10 and the soft foam layer 30. Specifically, the cover layer 20 may be positioned between the surface-treated layer 10 and the soft foam layer 30, and the rear layer 40 may be located on one side of the soft foam layer 30.

The cover layer 20 serves to ensure surface smoothness and to realize color, and may include at least one selected from the group consisting of polyvinyl chloride (PVC), polyvinyl chloride copolymer, polyurethane (PU), polyurethane copolymer, polypropylene oxide (PPO), polypropylene oxide copolymer, polyethylene oxide (PEO), polyethylene oxide copolymer, polyether urethane, cellulose acetate, cellulose acetate butyrate, cellulose acetate propionate, polymethyl methacrylate (PMMA), polymethyl acrylate (PMA), polyacrylic copolymer, polyvinyl acetate (PVAc), polyvinyl acetate copolymer, polyvinyl alcohol (PVA), polyfurfuryl alcohol (PPFA), polystyrene (PS), polystyrene copolymer, polycarbonate (PC), polycaprolactone (PCL), polyvinylpyrrolidone (PVP), polyvinylidene fluoride (PVdF), polyvinylidene fluoride copolymer, polyamide, and combinations thereof.

Specifically, the cover layer 20 may include a polyvinyl chloride (PVC), a polyvinyl chloride-acrylonitrile-butadiene-styrene (PVC-ABS) copolymer, a polyurethane (PU), or a polypropylene oxide. In this case, it is more advantageous in color implementation, calendaring and extrusion process, and in the relation with the surface-treated layer 10, the hardness of the cover layer 20 is lowered and the softness is increased, such that the surface physical properties such as tactile sensation can be improved. In addition, in relation with the soft foam layer 30, excellent compatibility with the cover layer 20 can be ensured, and an advantage can be obtained that the adhesive force and the laminate force are improved.

The rear layer 40 serves to support the mechanical properties and to maintain the topography of the assembly and prevent wrinkles. The rear layer 40 may be made of woven or non-woven fabrics including at least one selected from the group consisting of cotton, nylon, polyester, rayon, and combinations thereof. For example, the rear layer 40 may employ a woven or non-woven fabric including a cotton and a polyester. In this case, mechanical properties, flame retardancy, and the like can easily be ensured, and in relation with the soft foam layer 30, it is possible to obtain an advantage that the sewing performance and the clean appearance can be realized.

As described above, the seat cover for an automobile 100 can use a vacuum embossing method when the embossing pattern 50 is formed on the uppermost surface, so that since no pressure or heat is applied, the soft foam layer 30 can maintain substantially the same bubble characteristics and thickness formed at the time of foaming.

Specifically, the soft foam layer 30 may have a thickness of about 0.7 mm to about 0.9 mm. When the soft foam layer 30 maintains a thickness in the above range, a sufficient cushioning feel can be imparted to the seat cover for an automobile at the same time while securing an appropriate thickness of the seat cover as a whole.

Another embodiment of the present disclosure is a method for manufacturing a seat cover for an automobile, comprising the steps of: preparing a laminate including a surface-treated layer, a cover layer, a soft foam layer, and a rear layer; and forming an embossing pattern on a top surface of the laminate by a vacuum embossing process.

The method for manufacturing the seat cover for an automobile includes preparing a laminate including a surface-treated layer, a cover layer, a soft foam layer, and a rear layer, and then forming an embossing pattern on the top surface thereof, which therefore results in a seat cover for an automobile in which a surface-treated layer having an embossing pattern thereon, a cover layer, a soft foam layer and a rear layer are sequentially located from the top.

In addition, the manufacturing method for the seat cover for an automobile includes a surface-treated layer, a cover layer, a soft foam layer and a rear layer, and includes an embossing pattern formed on the top surface, wherein the soft foam layer includes about 15 to about 20 foam cells per unit area of 1 mm² of the layer surface.

Also, the seat cover for an automobile manufactured by the manufacturing method of the seat cover for an automobile may have a specific gravity of the soft foam layer in the range of about 0.7 to about 0.8, and the foam cell may be a spherical foam cell.

By using the above manufacturing method, it is possible to easily manufacture a seat cover for an automobile including an embossing pattern on the uppermost surface while maintaining a bubble structure at the time of foaming.

Further, the soft foam layer of the seat cover for an automobile may have spherical foam cells containing about 15 to about 20 foam cells per unit area of 1 mm² of the layer surface, and having a specific gravity of about 0.7 to about 0.8. In this case, the seat cover for an automobile can realize a significantly improved cushioning feel and surface texture.

The surface-treated layer, the cover layer, the soft foam layer, the rear layer and the embossing pattern are as described above.

The method for manufacturing a seat cover for an automobile includes a step of producing a laminate including a surface-treated layer, a cover layer, a soft foam layer and a rear layer, and, specifically, the step may be a step of producing a laminate in which a surface-treated layer, a cover layer, a soft foam layer and a rear layer are sequentially laminated from the top.

More specifically, the manufacturing method may include, in the step of producing the laminate, a rear layer is provided, and then a composition for preparing a foam layer for forming a soft foam layer is applied on the rear layer, and dried to form a pre-foamed layer. Subsequently, a cover layer and a surface-treated layer are sequentially laminated on the pre-foamed layer to prepare a structure in which a rear layer, a pre-foamed layer, a cover layer and a surface-treated layer are laminated, and the pre-formed layer can then be foamed by processing at a high temperature to produce a soft foam layer.

The soft foam layer is formed from a composition for preparing a foam layer, and specifically, the composition for preparing a foam layer may be prepared by heating and foaming the pre-foamed layer prepared by said coating and drying. The composition for preparing a foam layer is as described above.

The composition for preparing a foam layer may include the thermoplastic resin and the foaming agent as described above. The composition may be prepared as a pre-foamed layer and then heated and foamed at a temperature of about 200° C. to about 220° C. to form a soft foam layer. When the composition for preparing a foam layer is heated and foamed at a temperature within the above range, the soft foam layer can maintain the specific gravity in the above range and the number of foam cells per unit area, and it is possible to impart improved cushioning and softness to the seat cover and at the same time not to impair the physical properties of the adjacent layers during the foaming process.

The surface-treated layer may be formed from a waterborne coating composition. The waterborne coating composition is as described above.

Specifically, the surface-treated layer may be prepared by applying and drying the waterborne coating composition, followed by a primary aging at a temperature above a minimum film forming temperature (MFFT), and then a secondary aging at a temperature above a glass transition temperature (Tg).

As used herein, the term "minimum film-forming temperature (MFFT)" refers to a minimum temperature at which films are uniformly integrated when various coatings are applied on a surface as a thin film. A uniform film shape is formed at the minimum film forming temperature, and cracks or the like of the powder or film occurs at a temperature lower than the minimum film forming temperature.

At this time, the waterborne coating composition can be firstly aged at a temperature higher than the minimum film forming temperature (MFFT) to form a polyhedric structure, and then secondarily aged at a temperature higher than the glass transition temperature (Tg) to form a homogeneous structure. As a result, the seat cover produced by the above manufacturing method can have excellent surface physical properties.

The manufacturing method for a seat cover for an automobile may include the steps of: preparing a laminate including a surface-treated layer, a cover layer, a soft foam layer and a rear layer, and then forming an embossing pattern on a top surface of the laminate by a vacuum embossing process.

At this time, the vacuum embossing process may be performed under a vacuum gauge pressure of about 0.05 MPa to about 0.06 MPa. When the embossing pattern is transferred under a pressure in the above range, the bubble structure of the soft foam layer may not be damaged and the seat cover for an automobile manufactured by the manufacturing method can have excellent cushioning feel and softness.

Further, the vacuum embossing process may be performed at a temperature of about 160° C. to about 180° C. When the embossing pattern is transferred at a temperature within the above range, it is possible to realize an embossing pattern showing excellent texture without deteriorating the physical properties of other layers of the seat cover for an automobile, particularly, the foam structure of the soft foam layer, thereby achieving excellent cushioning feel, high softness and improved surface texture.

Specific embodiments of the present disclosure will now be described. However, the embodiments described below are only intended to illustrate or explain the present disclosure, and thus the present disclosure should not be limited thereto.

EXAMPLES AND COMPARATIVE EXAMPLES

Example 1

Nonwoven fabric made of a terry cloth including cotton and polyester was cut to a thickness of 0.6 mm to provide a rear layer.

Next, a thermoplastic resin composition containing a thermoplastic polyurethane (TPU) resin and a polyvinyl chloride (PVC) resin at a weight ratio of TPU:PVC=95:5 was prepared, and a composition for preparing a foam layer was prepared by mixing 7 parts by weight of an azodicarbonamide blowing agent based on 100 parts by weight of the thermoplastic resin. The composition for preparing a foam layer was applied to the top of the rear layer and dried to prepare a pre-foamed layer having a thickness of 0.4 mm.

A cover layer made of a mixture of a polyurethane (TPU) resin and a polyvinyl chloride (PVC) resin was laminated on the pre-foamed layer to a thickness of 0.15 mm.

Next, 40% by weight of the first compound of formula 1 (where n=100, $R_1$ and $R_2$ are a carboxyl group), 30% by weight of the second compound of formula 3, 20% by weight of water and 10% by weight of additive are mixed, followed by heating at a temperature of 100° C. for 2 minutes to form an interpenetrating polymer network, and a waterborne coating composition containing the same was prepared. Subsequently, the waterborne coating composition was applied to the top of the cover layer, and the water was evaporated by drying at a temperature of 140° C., followed by primary aging at a temperature of 80° C., and then secondary aging at a temperature of 50° C. to prepare a surface-treated layer having a thickness of 20 μm.

Subsequently, a laminate having a surface-treated layer, a cover layer, a pre-foamed layer and a rear layer laminated from the top was manufactured through a calendaring process. Then, the laminate was processed at 220° C. to foam the pre-foamed layer to form a soft foam layer, and then a vacuum embossing process was performed on the laminate having the surface-treated layer, the cover layer, the soft foam layer and the rear layer laminated from the top under a vacuum of 0.06 MPa and a temperature of 170° C. to transfer embossing patterns to the uppermost surface to thereby obtain a seat cover for an automobile.

Comparative Example 1

For the laminate of Example 1 in which the surface-treated layer, the cover layer, the soft foam layer and the rear layer were laminated from the top, a seat cover for an automobile was manufactured in the same manner as in Example 1 above, except that instead of the vacuum embossing process, a roll pressing process was performed under a pressure of 4 Mpa using an embossing roll having an embossing pattern on the surface, thereby transferring the embossing pattern to the uppermost surface.

Comparative Example 2

A seat cover for an automobile was manufactured in the same manner as in Example 1 above, except that instead of the waterborne coating composition, an oil-based coating composition comprising 15% by weight of a linear type of polycarbonate-polyurethane and 85% by weight of a ketone-based organic solvent was applied to the top of the cover layer, and a surface-treated layer was prepared by processing through a heat drying method through a drying oven.

Comparative Example 3

For the laminate of Example 1 in which the surface-treated layer, the cover layer, the soft foam layer and the rear layer were laminated from the top, a seat cover for an automobile was manufactured in the same manner as in Example 1 above, except that instead of the vacuum embossing process, a roll pressing process was performed under a pressure of 4 Mpa using an embossing roll having an embossing pattern on the surface, thereby transferring the embossing pattern to the uppermost surface, and instead of the waterborne coating composition, an oil-based coating composition comprising 15% by weight of a linear type of polycarbonate-polyurethane and 85% by weight of a ketone-based organic solvent was applied to the top of the cover layer, and a surface-treated layer was prepared by processing through a heat drying method through a drying oven.

Evaluation

Experimental Example 1

Measurement of Thickness and Softness of the Soft Foam Layer

The thicknesses of the respective soft foam layers of the seat cover for an automobile in Example 1 and Comparative Examples 1 to 3 were measured. The results are shown in Table 1 below using a softness measuring instrument (manufacturer, ST300D) under the conditions of a temperature of 23±2° C. and a relative humidity of 50±5%. Specifically, after preparing five test specimen having a pi ($\pi$) of 100 mm with respect to the seat cover for an automobile, the softness can be measured by reading the numerical value of the scale moved for 15 seconds by pushing them with the ST300D device.

Experimental Example 2

Measurement of the Amount of Volatile Organic Compounds (VOCs) Generated

With the seat cover for an automobile of Example 1 and Comparative Examples 1 to 3, a test specimen of an appropriate size was provided and the test specimen was placed in a 4 L glass desiccator and sealed and heated in an oven for 2 hours. Thereafter, the test specimen was allowed to stand in a laboratory at 25° C. for 1 hour, the lid of the desiccator was opened for about 3 cm to 4 cm, and the volatile organic compounds (VOCs) emitted from the test specimen were collected. The results are shown in Table 1 below.

TABLE 1

| | Physical properties of the soft foam layer | | | | Amount of VOCs generated [µg/m$^2$] |
|---|---|---|---|---|---|
| | Number of foam cells [No./mm$^2$] | Specific gravity | Thickness [mm] | Softness | |
| Ex. 1 | 15 | 0.70 | 0.9 | 3.8 | 220 |
| C. Ex. 1 | 5 | 1.10 | 0.5 | 3.3 | 300 |
| C. Ex. 2 | 14 | 0.75 | 0.5 | 3.7 | 850 |
| C. Ex. 3 | 5 | 1.10 | 0.5 | 2.3 | 880 |

Experimental Example 3

Measurement of Static Load Elongation and Residual Compression Set

The seat cover for an automobile of Example 1 and Comparative Examples 1 to 3 were each made of a specimen having a width of 50 mm and a length of 250 mm and then three specimens taken in the MD direction as a width and three specimens taken in the TD direction as a width, and then 100 mm distance line was drawn in the center. This was set at a clamp interval of 150 mm, and the load was left as it is for 10 minutes in a fatigue tester to measure the distance L1 between the lines. Further, the test specimen was removed from the clamp, the load was removed, and the test specimen was left a flat surface for 10 minutes, and then the distance L2 between the lines was obtained. The static load elongation and the residual compression set were calculated according to the following formula. The results are shown in Table 2 below.

Static load elongation (%)=L1–100

Residual compression set (%)=L2–100            [Formula]

L1: distance of the line after 10 minutes under load
L2: distance of the line after 10 minutes after removing the load

TABLE 2

| | Static load elongation [%] | | Residual compression set [%] | |
|---|---|---|---|---|
| | MD direction | TD direction | MD direction | TD direction |
| Ex. 1 | 20 | 35 | 2 | 5 |
| C. Ex. 1 | 14 | 62 | 3 | 8 |
| C. Ex. 2 | 16 | 55 | 4 | 9 |
| C. Ex. 3 | 15 | 58 | 3 | 13 |

Referring to the results shown in Table 1 above, the seat cover for an automobile in Example 1 was found to have a relatively thick thickness feeling and high softness by satisfying the number of foam cells of 15 to 20 pieces/mm$^2$, and the specific gravity of 0.7 to 0.8; and it can be seen that the seat cover for an automobile prepared by forming a surface-treated layer from a waterborne coating composition and forming an embossing pattern on the surface thereof by a vacuum embossing method has a thicker thickness feeling, a higher softness and an excellent foam cell structure of the soft foam layer, as well as an excellent cushioning feel as compared to that prepared from a surface-treated layer produced by a roll press method or that produced using an oil-based coating composition as in Comparative Examples 1 to 3.

Figure 2:
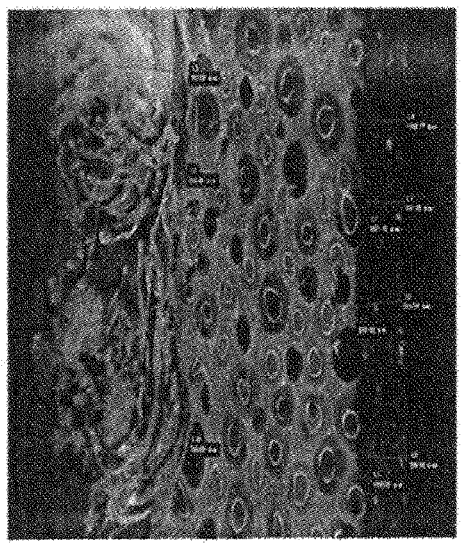
FIG. 2 are photographs of a cross sectional view of a seat cover for an automobile according to an embodiment of the present disclosure and a conventional seat cover for an automobile.
Figure 2:

Specifically, FIG. 2(a) is a photograph of a cross-section of the soft foam layer in the seat cover for an automobile according to Example 1, and FIG. 2(b) is a photograph of a cross-section of the soft foam layer of the seat cover for an automobile in Comparative Example 1. Referring to FIG. 2, it can be understood that the soft foam layer in Example 1 has a bubble structure and thickness superior in terms of cushioning feel as compared with the soft foam layer in Comparative Example 1.

In addition, the seat cover for an automobile in Example 1 is similar to the seat cover for an automobile in Comparative Examples 1 to 3 in terms of the static load elongation values in the MD direction and the TD direction. As a result, it is possible to improve the workability in the process when applied to an automotive, and it can be much more advantageous in terms of surface appearance, wrinkle prevention, and aesthetic effects.

Further, the seat cover for an automobile according to Example 1 satisfies the values of residual compression set in the MD direction and the TD direction of 2% to 4%, and 4% to 6%, respectively. As a result, an excellent appearance without wrinkles or distortion can be exhibited, and the workability of the finishing work can be improved.

BRIEF DESCRIPTION OF SYMBOLS

100: Seat cover for an automobile.
10: Surface-treated layer
20: Cover layer
30: Soft foam layer
40: Rear layer
50: Embossing pattern
A: foam cells

The invention claimed is:
1. An environmental friendly seat cover for an automobile, comprising:
   a surface-treated layer;
   a cover layer;
   a soft foam layer, wherein
      the soft foam layer comprises 15 to 20 foam cells per unit area of 1 mm² of the layer surface, and an average diameter of the form cells ranges from 135 μm to 200 μm,
      the soft foam layer has a specific gravity ranging from 0.7 g/cc to 0.8 g/cc,
      a thickness of the soft foam layer ranges from 0.8 mm to 0.9 mm; and
   a rear layer,
   wherein
   the seat cover has an embossing pattern formed on an uppermost surface thereof,
   a constant load elongation of the seat cover in an MD direction ranges from 17% to 20%, and a constant load elongation of the seat cover in a TD direction ranges from 35% to 42%, and
   a residual compression of the seat cover set in the MD direction is 4% or less, and a residual compression of the seat cover set in the TD direction is 14% or less,
   wherein the surface-treated layer is formed from a waterborne coating composition, the waterborne coating composition comprises:
   a first compound having at least two functional groups per molecule, and the at least two functional groups of the first compound are selected from the group consisting of a carboxyl group, a hydroxyl group, an amino group, and combinations thereof; and
   a second compound having at least two functional groups selected from the group consisting of an aziridine group, an isocyanate group, and a carbodiimide group per molecule, wherein the second compound comprises a compound having an isocyanate group, and the compound having an isocyanate group comprises at least one compound represented by Formula 3-5:

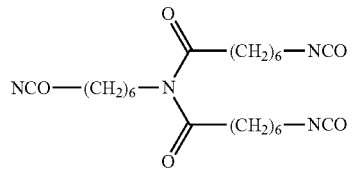

[Formula 3]

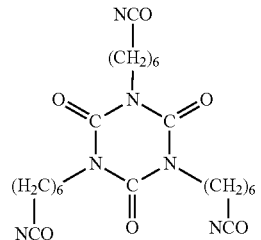

[Formula 4]

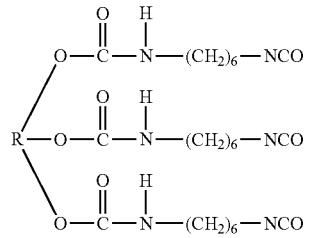

[Formula 5]

wherein the embossing pattern is a hemisphere shape pattern formed by a vacuum embossing process,
wherein an amount of volatile organic compounds generated in the seat cover is 200 μg/m² or less, and
wherein the cover layer and the soft foam layer are made of a thermoplastic resin composition comprising a thermoplastic polyurethane (TPU) resin and a polyvinyl chloride (PVC) resin.

2. The environmental friendly seat cover for an automobile of claim 1, wherein the foam cell is a spherical foam cell.

3. The environmental friendly seat cover for an automobile of claim 1, wherein the rear layer is a woven or nonwoven fabric comprising at least one selected from the group consisting of cotton, nylon, polyester, rayon, and combinations thereof.

4. The environmental friendly seat cover for an automobile of claim 1, wherein the first compound has a structure of Formula 1 or Formula 2:

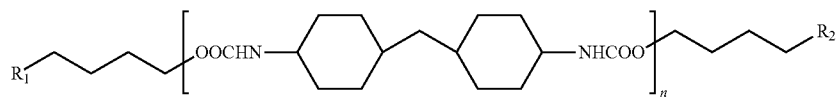

[Formula 1]

wherein in Formula 1, $R_1$ and $R_2$ are the same or different, each of $R_1$ and $R_2$ is independently a carboxyl group, a hydroxyl group, or an amino group, and n is an integer ranging from 100 to 200,

[Formula 2]

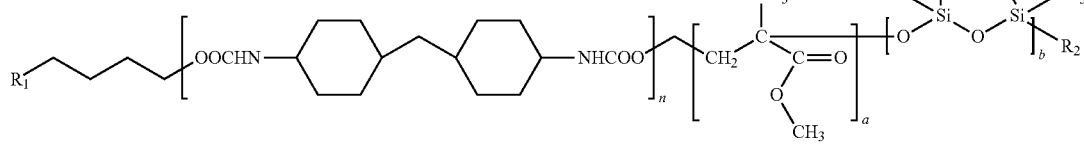

wherein in the Formula 2, $R_1$ and $R_2$ are the same or different, each of $R_1$ and $R_2$ is independently a carboxyl group, a hydroxyl group or an amino group, and n, a and b are each independently an integer ranging 100 to 200.

5. A method for manufacturing a seat cover for an automobile, comprising:
preparing a laminate comprising a surface-treated layer, a cover layer, a soft foam layer, and a rear layer; and
forming an embossing pattern on an uppermost surface of the laminate by a vacuum embossing process, wherein the embossing pattern is a hemisphere embossing pattern,
wherein
the soft foam layer comprises 15 to 20 foam cells per unit area of 1 mm² of the layer surface, and an average diameter of the form cells ranges from 135 μm to 200 μm,
the soft foam layer has a specific gravity ranging from 0.7 g/cc to 0.8 g/cc,
a thickness of the soft foam layer ranges from 0.8 mm to 0.9 mm,
a constant load elongation of the seat cover in an MD direction ranges from 17% to 20%, and a constant load elongation of the seat cover in a TD direction ranges from 35% to 42%, and
a residual compression of the seat cover set in the MD direction is 4% or less, and a residual compression of the seat cover set in the TD direction is 14% or less,
the surface-treated layer is formed from a waterborne coating composition, the waterborne coating composition comprises:
a first compound having at least two functional groups per molecule, and the at least two functional groups of the first compound are selected from the group consisting of a carboxyl group, a hydroxyl group, an amino group, and combinations thereof; and
a second compound having at least two functional groups selected from the group consisting of an aziridine group, an isocyanate group, and a carbodiimide group per molecule, wherein the second compound comprises a compound having an isocyanate group, and the compound having an isocyanate group comprises at least one compound represented by Formula 3-5:

[Formula 3]

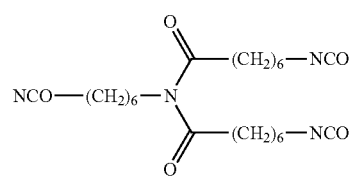

[Formula 4]

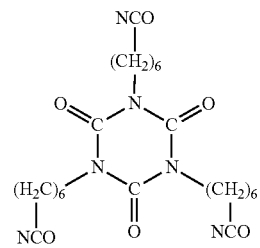

[Formula 5]

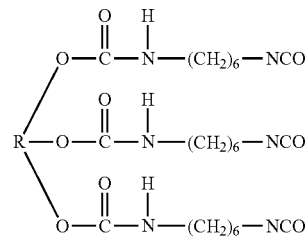

wherein an amount of volatile organic compounds generated in the seat cover is 200 μs/m² or less, and
wherein the cover layer and the soft foam layer are made of a thermoplastic resin composition comprising a thermoplastic polyurethane (TPU) resin and a polyvinyl chloride (PVC) resin.

6. The method for manufacturing a seat cover for an automobile of claim 5, wherein the surface-treated layer is formed by applying and drying the waterborne coating composition on the cover layer, followed by a first aging at a temperature above a minimum film forming temperature (MFFT) of the waterborne coating composition, and then a second aging at a temperature above a glass transition temperature (Tg) of the waterborne coating composition.

7. The method of manufacturing a seat cover for an automobile of claim 6, wherein the waterborne coating composition comprises:
the first compound;
the second compound; and
an aqueous solvent.

8. The method of manufacturing a seat cover for an automobile of claim 5, wherein the soft foam layer is formed by heating and foaming a composition for preparing a foam layer at a temperature of 200° C. to 220° C.

9. The method of manufacturing a seat cover for an automobile of claim 5, wherein the vacuum embossing process is performed under a vacuum gauge pressure of 0.05 MPa to 0.06 MPa.

10. The method of manufacturing a seat cover for an automobile of claim 5, wherein the vacuum embossing process is performed at a temperature of 160° C. to 180° C.

11. The method of manufacturing a seat cover for an automobile of claim 5, wherein the soft foam layer is formed from a composition for preparing a foam layer comprising the thermoplastic resin and a foaming agent.

12. The method of manufacturing a seat cover for an automobile of claim 11, wherein the composition for preparing a foam layer contains 5 to 10 parts by weight of the foaming agent, based on 100 parts by weight of the thermoplastic resin.

* * * * *